(No Model.)

M. HOGAN.
WATER COCK.

No. 267,787.  Patented Nov. 21, 1882.

Witnesses:
Chas. L. Burdett
W. H. Marsh

Inventor:
Matthew Hogan
By W. E. Simonds,
Atty

UNITED STATES PATENT OFFICE.

MATTHEW HOGAN, OF HARTFORD, CONNECTICUT.

WATER-COCK.

SPECIFICATION forming part of Letters Patent No. 267,787, dated November 21, 1882.

Application filed June 10, 1882. (No model.)

*To all whom it may concern:*

Be it known that I, MATTHEW HOGAN, of Hartford, in the county of Hartford and State of Connecticut, have invented certain new and useful Improvements in Water-Cocks, of which the following is a description, reference being had to the accompanying drawings, where—

Figure 1:
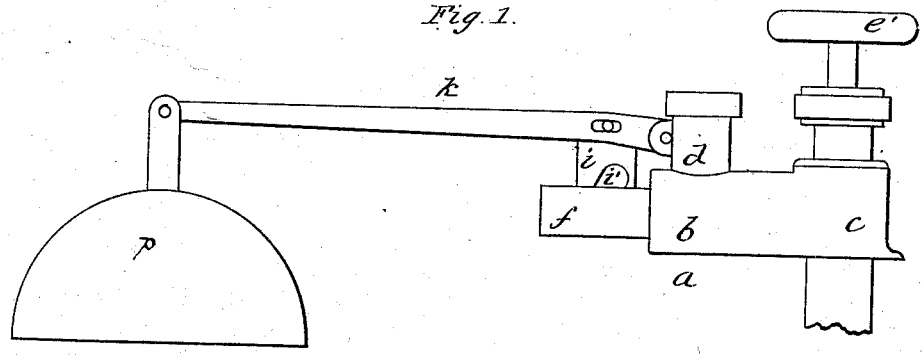
Figure 2:
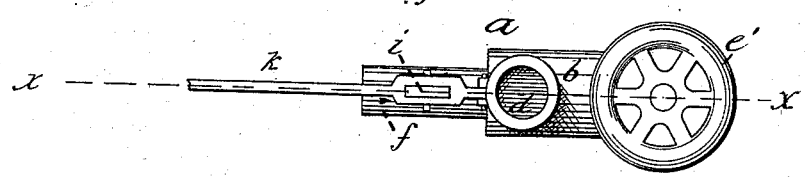
Figure 3:
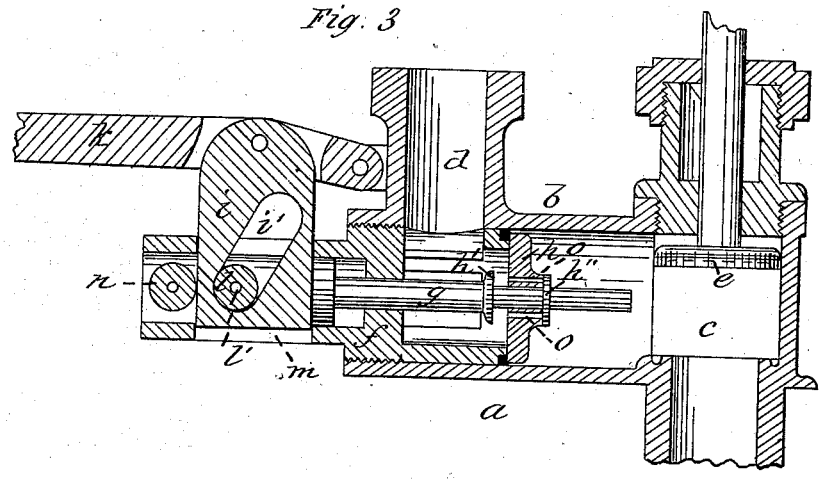

Figure 1 is a side view of my device with a lever and float attached for use in connection with a water-tank. Fig. 2 is a top view of the same with float removed. Fig. 3 is a longitudinal central section of same, on plane denoted by line $x\ x$, on enlarged scale.

My invention relates particularly to the class of water cocks or valves used in connection with tanks, and adapted to open and close by the fall or rise of a float attached to a lever.

It consists in the improved method of operating the valve by means of wedge-shaped mortise in connection with the valve-rod and lever, and in various details of the device, more fully described herein.

In the accompanying drawings, the letter $a$ denotes a water-cock body consisting of tubular body $b$ and branches $c$ and $d$. Branch $c$ is adapted to be secured to a water-pipe, and is provided with a valve, $e$, operated by hand-wheel $e'$, to open or close the main pipe during repairs to the cock. Into the other end of the body $b$ screws the plug $f$, having at its inner end a water-way and valve-seat. The outer end of the plug has a tubular socket, in which reciprocates the valve-stem $g$. The branch $c$ is opened and closed to the passage of water by a disk-valve, $h$, arranged to play between the collars $h'\ h^2$, appurtenant to the valve-stem $g$, which is reciprocated centrally of the plug by the cam-block $i$, pivotally-connected with lever $k$, and having a diagonal cam-slot, $i'$, in which slot works the friction-roll $l$. This is held by pin $l'$ between the forked end of stem $g$. The cam-block $i$ reciprocates in the mortise $m$ in contact with the friction-roll $n$, pivoted in the lug. The lever $k$ is pivotally connected to branch $d$ at one end, and is supplied at its opposite end with a float, $p$, suspended in the tank, to which the cock may be attached.

When in use the water (in case the cock is closed) presses against the disk $h$, and when the float is depressed the cam-slot $i'$, by the downward movement of the cam-block $i$, forces back the stem $g$ and collar $h''$, opening the perforations $o$ in the disk and slightly relieving the pressure by the flow of water through them. As the float continues to fall the disk is forced from its seat and the water flows freely through the cock.

The inner end of the plug has a shoulder, $f'$, adapted to hold a washer of suitable material—as rubber—against which the disk seats, and for which valve it forms a packing.

My device may be used with body $b$ in a vertical position by using the lever bent near the cam-block at about right angles and so arranged that the cam-block reciprocates horizontally.

I claim as my invention—

1. In combination, in a water-cock, body $a$, plug $f$, stem $g$, valve $h$, cam-block $i$, having a diagonal slot, $i'$, and pivotally connected with lever $k$, whereby the cock is operated, all substantially as described, and for the purpose set forth.

2. In combination, in a water-cock, a body, $a$, plug $f$, and centrally-reciprocating valve-stem $g$, and valve $h$, operated by means of a diagonal slot in a cam-block pivotally connected with a lever, all substantially as described.

3. In a water-cock, a plug adapted to be secured in a body, $a$, and having its inner end faced as a valve-seat and provided with an annular packing, all substantially as described.

4. In a water-cock, a body, $a$, having one or more branches for the reception of valves, in combination with a plug, $f$, with centrally-reciprocating valve-stem, $g$, bearing a valve, $h$, operated by a slotted cam-block and lever, all substantially as described.

MATTHEW HOGAN.

Witnesses:
CHAS. L. BURDETT,
W. H. MARSH.